US009352302B2

(12) United States Patent
Maparu et al.

(10) Patent No.: US 9,352,302 B2
(45) Date of Patent: *May 31, 2016

(54) VISIBLE LIGHT RESPONSIVE DOPED TITANIA PHOTOCATALYTIC NANOPARTICLES AND PROCESS FOR THEIR SYNTHESIS

(71) Applicant: TATA CONSULTANCY SERVICES LTD, Mumbai, Maharashtra (IN)

(72) Inventors: Auhin Kumar Maparu, West Bengal (IN); Beena Rai, Maharashtra (IN)

(73) Assignee: TATA CONSULTANCY SERVICES LTD, Mumbai, Maharashtra (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,011

(22) Filed: Jul. 18, 2014

(65) Prior Publication Data

US 2015/0024930 A1    Jan. 22, 2015

(30) Foreign Application Priority Data

Jul. 20, 2013  (IN) .......................... 2425/MUM/2013

(51) Int. Cl.
*B01J 23/00* (2006.01)
*B01J 23/02* (2006.01)
(Continued)

(52) U.S. Cl.
CPC ................ *B01J 23/52* (2013.01); *B01J 21/063* (2013.01); *B01J 23/50* (2013.01); *B01J 35/002* (2013.01); *B01J 35/004* (2013.01); *B01J 35/023* (2013.01); *B01J 37/009* (2013.01); *B01J 37/0036* (2013.01); *B01J 37/32* (2013.01); *B82Y 30/00* (2013.01); *C01G 23/047* (2013.01); *C01P 2002/52* (2013.01); *C01P 2002/54* (2013.01); *C01P 2002/72* (2013.01); *C01P 2002/84* (2013.01); *C01P 2004/03* (2013.01);
(Continued)

(58) Field of Classification Search
CPC .......... B01J 21/063; B01J 23/48; B01J 23/50; B01J 23/52; B01J 23/66
USPC ......................................... 502/344, 347, 350
See application file for complete search history.

(56) References Cited

U.S. PATENT DOCUMENTS 6,653,356 B2 * 11/2003  Sherman ............... B01J 13/0047
                                                       423/610
7,521,394 B2 *  4/2009  Xie ........................ B01J 21/063
                                                       423/610

(Continued)

OTHER PUBLICATIONS

Aysin et al., "Production of Silver Loaded Photocatalytic TiO2 Powders by Ball Milling", Czech Republic, Nanocon, 2011, total of 6 pages.

(Continued)

*Primary Examiner* — Cam N. Nguyen
(74) *Attorney, Agent, or Firm* — Collard & Roe, P.C.

(57) ABSTRACT

Present disclosure provides a process for the synthesis of visible light responsive doped titania photocatalysts. The process involves step a) milling a mixture containing titania and a precursor compound, the compound selected from the group consisting of chloroauric acid and a mixture containing chloroauric acid and silver nitrate, in the presence of water and oxide milling media, at a temperature in the range of 20 to 50° C. for a period of 60-120 minutes, to form a slurry, wherein the amount of water is in the range of 15 to 25% by weight of the total mixture; and b) filtering the slurry to separate the oxide milling media and obtain a filtrate containing doped titania nanoparticles.

10 Claims, 7 Drawing Sheets

(51) Int. Cl.
  *B01J 23/04* (2006.01)
  *B01J 23/48* (2006.01)
  *B01J 23/50* (2006.01)
  *B01J 23/52* (2006.01)
  *B01J 21/06* (2006.01)
  *B01J 37/32* (2006.01)
  *B01J 35/00* (2006.01)
  *B01J 35/02* (2006.01)
  *B01J 37/00* (2006.01)
  B82Y 30/00 (2011.01)
  C09C 1/36 (2006.01)
  C01G 23/047 (2006.01)

(52) U.S. Cl.
  CPC ......... *C01P2004/51* (2013.01); *C01P 2004/52* (2013.01); *C01P 2004/64* (2013.01); *C09C 1/3623* (2013.01)

(56) References Cited

U.S. PATENT DOCUMENTS

| | | | | |
|---|---|---|---|---|
| 7,901,660 | B2 * | 3/2011 | Xie | A61L 2/084 423/385 |
| 8,172,951 | B2 * | 5/2012 | Massholder | C11D 3/0063 134/1 |
| 8,372,416 | B2 * | 2/2013 | Kshirsagar | A01N 59/16 424/409 |
| 8,791,044 | B2 * | 7/2014 | Varma | B01J 21/063 106/287.19 |
| 2004/0120884 | A1 * | 6/2004 | Sherman | B01J 13/0047 423/608 |
| 2006/0034752 | A1 * | 2/2006 | Lin | B01J 23/42 423/610 |
| 2006/0116282 | A1 * | 6/2006 | Honda | B01J 21/063 502/129 |
| 2006/0210798 | A1 * | 9/2006 | Burda | A61K 33/00 428/402 |
| 2009/0263298 | A1 * | 10/2009 | Hsu | B01J 19/123 422/186.3 |
| 2010/0137131 | A1 * | 6/2010 | Awazu | B01J 21/063 502/240 |
| 2010/0213046 | A1 * | 8/2010 | Grimes | B01J 23/42 204/157.47 |
| 2012/0028791 | A1 * | 2/2012 | Osterlund | B01J 21/063 502/171 |
| 2013/0192976 | A1 * | 8/2013 | Sambandan | B01J 37/086 204/157.15 |
| 2013/0274091 | A1 | 10/2013 | Maparu et al. | |
| 2014/0011674 | A1 * | 1/2014 | Tsai | B01J 23/8926 502/330 |
| 2014/0216918 | A1 * | 8/2014 | Yang | B01J 23/52 204/157.15 |

OTHER PUBLICATIONS

Rattanakam et al., "Visible-light-sensitive N-doped $TiO_2$ photocatalysts prepared by a mechanochemical method: effect of a nitrogen source", Res Chem Intermed (2009) 35, pp. 263-269.

Vilimova et al., "Nitrogen Dopped Composite Kaolinite/$TiO_2$", Czech Republic, Nanocon, 2012, total of 6 pages.

* cited by examiner

VISIBLE LIGHT RESPONSIVE DOPED TITANIA PHOTOCATALYTIC NANOPARTICLES AND PROCESS FOR THEIR SYNTHESIS

CROSS REFERENCE TO RELATED APPLICATIONS

Applicant claims priority under 35 U.S.C. §119 of Indian Application No. 2425/MUM/2013 filed on Jul. 20, 2013, the disclosure of which is incorporated by reference.

FIELD OF DISCLOSURE

The present disclosure relates to doped titania nanoparticles.

Particularly, the present disclosure relates to doped titania nanoparticles having photocatalytic activity under visible light irradiation.

BACKGROUND

In recent years, photocatalysts has been recognized as a desirable technology for chemical synthesis and chemical degradation such as air and water purification, anti-bacterial applications, self-cleaning coatings, and deodorization etc. Titanium dioxide is a photocatalyst which is active under ultraviolet (UV) light. Titanium dioxide ($TiO_2$) has been of particular interest due to its low cost, almost no toxicity, chemical stability (both to light and the environment) and high photo activity. A large number of prior state of the art references have mentioned using titanium dioxide as a photocatalyst.

$TiO_2$ has been used in a wide range of applications including ultraviolet filters for optics and packing materials, environmental remediation, papermaking, ceramics, solar cells, electro-chromic displays, anodes for ion batteries, self-cleaning coatings and paints and humidity as well as gas sensors.

Since titanium dioxide of the anatase type or rutile type has a band gap of 3.2 eV (corresponding to a wavelength of 387.5 nm) or 3.0 eV (corresponding to a wavelength of 413.3 nm), respectively, only UV light having wavelength of less than 387 nm can be utilized for its activation, and visible light (380 to 700 nm) cannot be utilized at all. Titanium dioxide is difficult to be utilized in the applications of interior paints, textiles and sick house syndrome alleviating agents that are used in a room where substantially no UV light exists. While functional under UV irradiation, photo-catalysis generally does not occur in indoor areas under conventional artificial light or even ambient daylight as UV is not present and the application of titanium dioxide has been restricted in actuality.

Many attempts have been made to modify the photocatalytic activity by doping titanium dioxide with a number of different compounds and using a number of different techniques. Several different nitrogen-containing compounds have been tried using a variety of different doping reactions. Also, a number of attempts have been made to modify $TiO_2$ to enhance its activity by doping the crystalline structure with a variety of compounds including those with carbon or sulfur atoms. However, these attempts have limited stability and efficiency or were active only or primarily under UV light.

Some attempts have been made to obtain visible light activation of the photocatalyst by the red shift of the absorption spectrum. Nitrogen doping and silver doping have been effective in decreasing the band gap of $TiO_2$. Various methods include photo deposition, chemical reduction, liquid impregnation, deposition-precipitation, sonochemical synthesis etc. Most of these processes require long synthesis time and sometimes calcination for removal of undesired products on the surface of titania.

Mechanochemical method has recently become a promising technology for doping on titania.

Aysin et al (in Brno, Czech Republic, EU, 21.-23.9.2011 reported photocatalytic efficiency of silver loaded nano-sized photocatalytic titania powder prepared by ball milling of photocatalytic titania powder (anatase), with 0.1 M silver nitrate solution and 1% sodium carbonate solution. Photocatalytic performance was evaluated under UV light illumination. It was observed that though the silver loading enhances the photocatalytic activity, as amount of silver loading increased, the photocatalytic activity of doped titania powder decreased.

Ramida Rattanakam et al in Res Chem Intermed (2009) 35: 263-269 reported preparation of N-doped $TiO_2$ by a mechanochemical method using high-speed ball milling of P25 $TiO_2$ with nitrogen source such as ammonia solution, hexamine and urea. The photocatalytic activity of the N-doped $TiO_2$ was evaluated under sunlight irradiation. The results indicated a slight anatase to rutile phase transformation during the mechanochemical process. It was observed that the photocatalytic activity of the doped titania particles was not improved as compared to the starting P25.

In a co-pending patent application 1224/MUM/2012, which is the priority of later filed U.S. patent application Ser. No. 13/861,643 filed on Apr. 12, 2013 published as U.S. Patent Application Publication No. 2013/0274091 on Oct. 17, 2013 and which issued as U.S. Pat. No. 9,006,124 on Apr. 14, 2015 which is incorporated herein by reference, silver doped titania having photocatalytic activity greater than 90% in 3 hrs under sunlight irradiation, is developed using a mechanochemical method. However, the document does not disclose photocatalytic effectiveness of the doped titania using ambient light, particularly in poorly illuminated areas.

Therefore, there is felt a need to develop a suitable doped titania photocatalyst which shows higher photocatalytic activity under visible or artificial light irradiation.

Objects

It is an object of the present disclosure to provide a doped titania having high photocatalytic activity under visible or artificial light irradiation.

Another object of the present disclosure is to provide a feasible process for preparing visible light responsive doped titania photocatalyst.

SUMMARY

In accordance with the present disclosure, there is provided a process for the synthesis of visible light responsive doped titania photocatalyst, said process comprising the following steps:

a) milling a mixture containing titania, a precursor compound, water and oxide milling media, at a temperature in the range of 20 to 50° C. for a period of 30-240 minutes, to form a slurry, wherein the amount of water is in the range of 15 to 25% by weight of the total mixture; and b) filtering the slurry to separate the oxide milling media and obtain a filtrate containing doped titania nanoparticles.

Typically, the precursor compound is at least one selected from the group consisting of chloroauric acid and a mixture containing chloroauric acid and silver nitrate.

Typically, the doped titania prepared in accordance with the present disclosure is a gold doped titania wherein the amount of gold atoms doped on titania surface is in the range of 0.5 to 0.7% by weight.

In another embodiment of the present disclosure, the gold doped titania prepared in accordance with the present disclosure further comprises silver atoms on titania surface wherein the amount of silver atoms doped on titania surface is in the range of 0.02 to 0.07% by weight.

BRIEF DESCRIPTION OF THE ACCOMPANYING DRAWINGS

The disclosure will now be described with the help of the accompanying drawings, in which.

DETAILED DESCRIPTION

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Titanium dioxide exists in nature as three different phases namely, anatase, rutile and brookite. It is mainly sourced from ilmenite ore, the most wide spread form of titanium dioxide-bearing ore around the world. Rutile is the next most abundant and contains around 98% titanium dioxide in the ore. The minerals rutile and brookite as well as anatase all have the same chemistry, but they have different structures. Rutile is the more common and well known mineral of the three, while anatase is the rarest. Anatase shares many of the same or nearly the same properties as rutile such as luster, hardness and density. However due to structural differences anatase and rutile differ slightly in crystal habit and more distinctly in cleavage. The metastable anatase and brookite phases convert to rutile upon heating.

The most common commercially available titania containing 77 wt % anatase and 23 wt % rutile form is P25, possessing high photocatalytic activity. It is found that the photocatalytic activity of P25 under visible light irradiation is higher than the pure anatase form. Accordingly, P25 is used as a standard benchmark for comparing the photocatalytic activity of any visible light responsive doped titania photocatalyst.

Among the different methods available for doping, mechanochemical synthesis using ultra-fine grinding is found to be the most useful due to its simplicity and scalability. However, during ultrafine grinding, undesired byproducts may be deposited on the surface of titania, thereby suppressing its photocatalytic activity, the removal of which requires high temperature calcination which leads to particle agglomeration, sintering, phase change and increased cost of production.

Inventors of the present disclosure have surprisingly found out by selecting a suitable metal dopant, milling speed, milling time, milling media size, dopant dosage etc., a doped titania with higher photocatalytic activity than the commercial titania may be developed.

In accordance with the present disclosure, the doped titania photocatalysts are synthesized by milling titania particles with a precursor compound in a planetary ball mill. The milling is carried out in presence of water and oxide milling balls, preferably zirconia balls. The temperature of the process is maintained at a range of 20 to 50° C., more preferably at a range of 30 to 40° C. by controlling the amount of water used in the process.

In a preferred embodiment of the present disclosure, the precursor compound is selected from the group consisting of a chloroauric acid and a mixture of chloroauric acid and silver nitrate to yield gold (Au) doped titania or a mixture containing gold and silver doped titania (Au/Ag) respectively.

In accordance with the present disclosure, the ratio of precursor compound to titania is 1:80 to 3:80 w/w.

In a preferred embodiment of the present disclosure, the amount of water is in the range of 15 to 25% by weight of the total mixture.

Milling of anatase titania particles in the presence of very low amount of water may affect the rheology (i.e. particles will not be in suspension) and hence the energy applied in the milling may not lead to efficient mechanochemical reaction. An adequate amount of water is required to form the slurry of right rheology for the efficient mechano-chemical synthesis.

In accordance with the present disclosure, titania about 3.4-5 gm is mixed with the precursor compound (50-150 mg), and 20-30 ml water in a ball mill jar. Zirconia balls about 50-150 gm as an oxide milling media of 0.4-0.7 min diameter are introduced in the jar. Milling is carried out intermittently at a speed of 200-300 rpm for 0.5-4 hours, controlling the temperature of the process in the range of 20 to 50° C. The resultant slurry after milling is filtered through a filter cloth to separate the oxide milling media and the particles in the filtrate are washed with water. The filtrate can be dried using freeze drying, vacuum drying and air drying techniques to obtain dry doped titania nanoparticles for characterization. However, for the photocatalytic applications, nanoparticles of titania can be used in the slurry form and hence the drying may not be required.

In still another preferred embodiment of the present disclosure the amount of Au dopant on the surface of titania is in the range of 0.5-0.7% by weight and the amount of Ag dopant on the surface of titania is in the range of 0.02-0.07% by weight.

The photocatalytic activity of doped titania nanoparticles is evaluated with the degradation of methyl orange, a model pollutant under irradiation of visible light. The doped titania nanoparticles prepared in accordance with the present disclosure are found to be stable with 85-90 nm particle size. The doped titania nanoparticles show unimodal particle size distribution. No agglomeration of the titania particles is observed during the milling process.

The disclosure is further illustrated with the help of the following examples which should not be construed to limit the disclosure in any way.

Example 1

4.0 gm of titania particles (as-received) were mixed with 0.105 gm of chloroauric acid and 25 ml water in a ball mill pot. Zirconia balls (100 gm) of 0.4-0.7 mm diameter were introduced as oxide milling media in the tank. Milling was carried out at a speed of 250 rpm for one hour at 20 to 50° C. The resultant slurry after milling was filtered through a filter cloth to separate the oxide milling media. The doped titania particles were further isolated from the filtrate and washed with water before characterization. Percentage of Au dopant was 1.5%. (Ratio of precursor to titania was 11:411).

Examples 2-7

The process as illustrated in example 1 was repeated using varying amount of chloroauric acid to obtain Au doped titania with Au dopant dosage in the range of 0.5 to 3.5%.

Amount of chloroauric acid content and the corresponding value of dopant dosage (Au %) are mentioned in Table 1.

TABLE 1

| Examples | Dopant dosage (Au %) | Chloroauric acid content (gm) |
| --- | --- | --- |
| 2 | 0.5 | 0.035 |
| 3 | 1.0 | 0.070 |
| 4 | 2.0 | 0.141 |
| 5 | 2.5 | 0.177 |
| 6 | 3.0 | 0.213 |
| 7 | 3.5 | 0.250 |

Examples 8-12

The process as illustrated in example 1 was repeated using a mixture of chloroauric acid and silver nitrate as the precursor compound.

Amount of chloroauric acid/silver nitrate content in gm and the corresponding value of dopant % are mentioned in Table 2.

TABLE 2

| Examples | Chloroauric acid content (gm) | Silver nitrate content (gm) | Au % | Ag % |
| --- | --- | --- | --- | --- |
| 8 | 0.0107 | 0.205 | 0.15 | 3.15 |
| 9 | 0.0214 | 0.182 | 0.3 | 2.8 |
| 10 | 0.0320 | 0.159 | 0.45 | 2.45 |
| 11 | 0.0425 | 0.1360 | 0.6 | 2.1 |
| 12 | 0.0531 | 0.113 | 0.75 | 1.75 |

The samples as obtained from the above examples were tested for characterization as follows.

UV Visible Spectroscopy:

FIGS. 1a, 1b, 1c, and 1d show the effect of dopant dosage (examples 1-7), milling time, milling speed and milling media size under a suitable reaction condition on the UV-visible absorption spectra of gold doped titania prepared in accordance with the present disclosure. It can be clearly seen that process with dopant dosage of 1.5% Au on titania surface, milling time of 1 hr, milling speed of 250 rpm and milling media size of 0.4 to 0.7 mm yield a doped titania with high photocatalytic activity. This sample will be referred as Au doped titania in subsequent sections.

Figure 1:
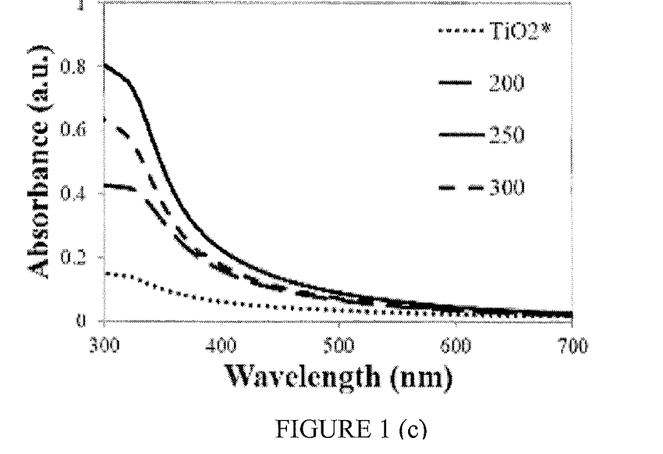
FIGS. 1a, 1b, 1c and 1d shows effect of dopant dosage (wt %, Au), milling time (minutes), milling speed (rpm) and milling media size (mm), respectively on the UV-visible absorption spectra of Au doped titania prepared in accordance with the present disclosure under a suitable reaction condition.
Figures 1A, 1B:
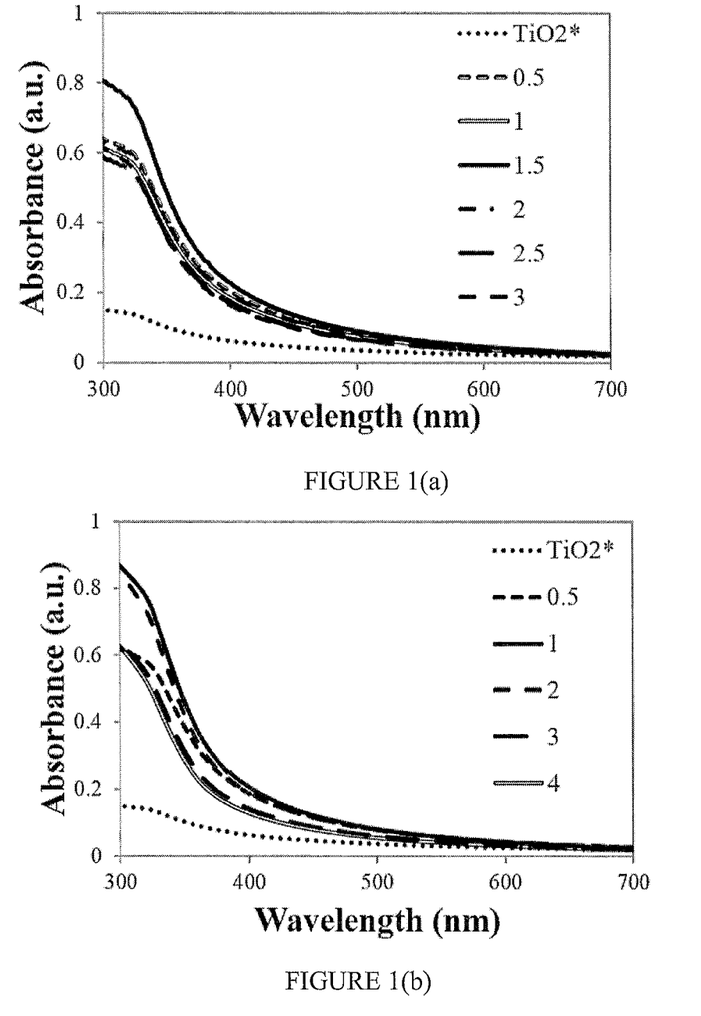
Figure 2:
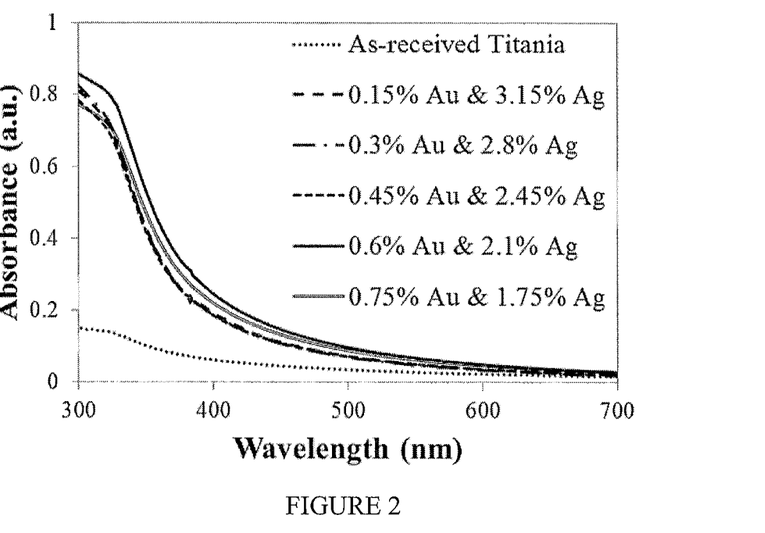
FIG. 2 shows the UV visible spectra of as-received titania and Au/Ag co-doped titania at different dopant dosage.

FIG. 2 shows UV visible spectra of as-received titania and examples 8-12. Example 11 was found to possess maximum absorption in the visible region and will be referred as Au/Ag co-doped titania in subsequent sections.

Figure 3:
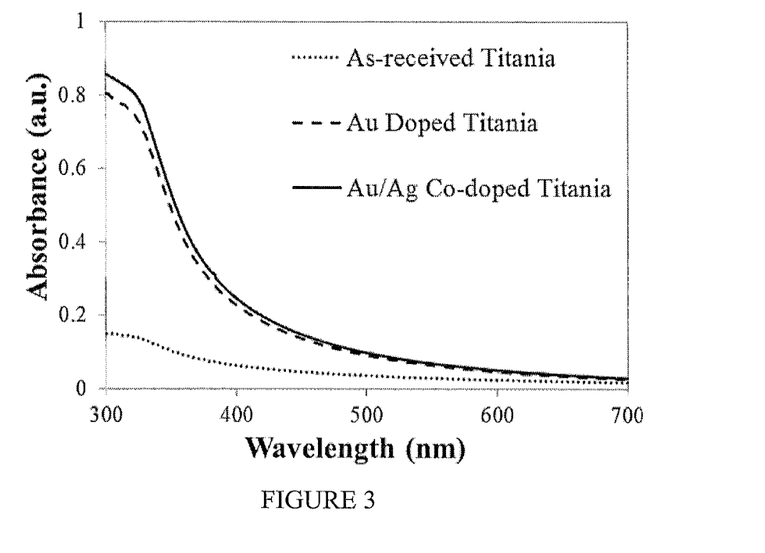
FIG. 3 shows the UV visible spectra of as-received titania, Au doped titania and Au/Ag co-doped titania.

FIG. 3 shows UV visible spectra of as-received titania, Au doped titania and Au/Ag co-doped titania particles. It can be clearly seen that for both Au doped and Au/Ag co-doped titania samples, the absorption hand shifts towards the visible region.

Figure 4:
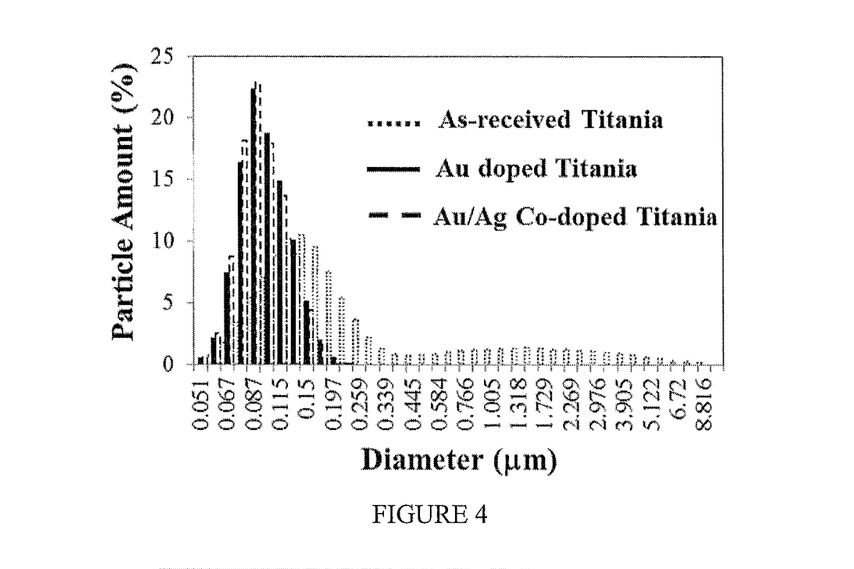
FIG. 4 shows particle size distribution of as-received titania, Au doped titania and Au/Ag co-doped titania in accordance with this disclosure.

Particle Size Distribution:

FIG. 4 show particle size distribution of as-received titania, Au doped titania and Au/Ag co-doped titania, respectively. Titania possesses bimodal size distribution, one in 0.05 to 3 μm range and another one in 0.4-8 μm range. Doped titania particles are unimodal with median size 86-88 null.

Figure 5:
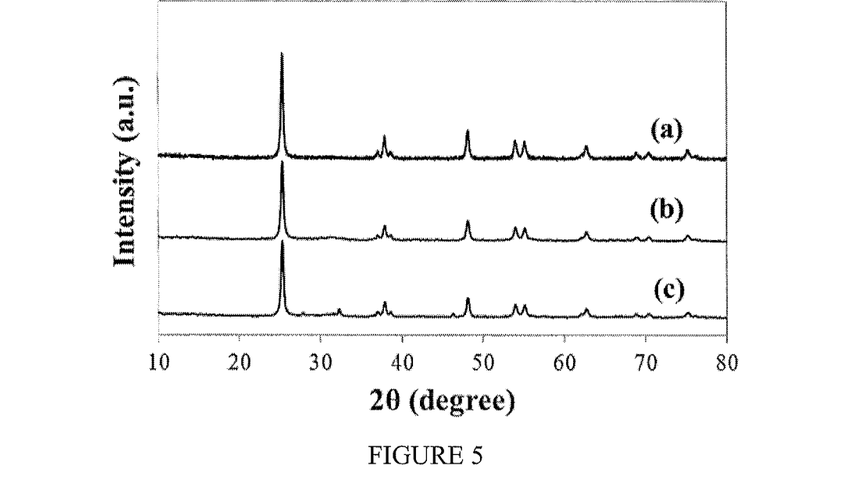
FIG. 5 shows X-ray diffraction patterns of a) as-received titania, b) Au doped titania and c) Au/Ag co-doped titania in accordance with this disclosure.

X-Ray Diffraction Analysis:

The powder XRD patterns of as-received titania, Au doped titania and Au/Ag co-doped titania are shown in FIG. 5. The absence of rutile or brookite peaks in the XRD spectra of doped samples confirm that the crystal phase of anatase titania does not change during the mechanochemical synthesis.

Figure 6:
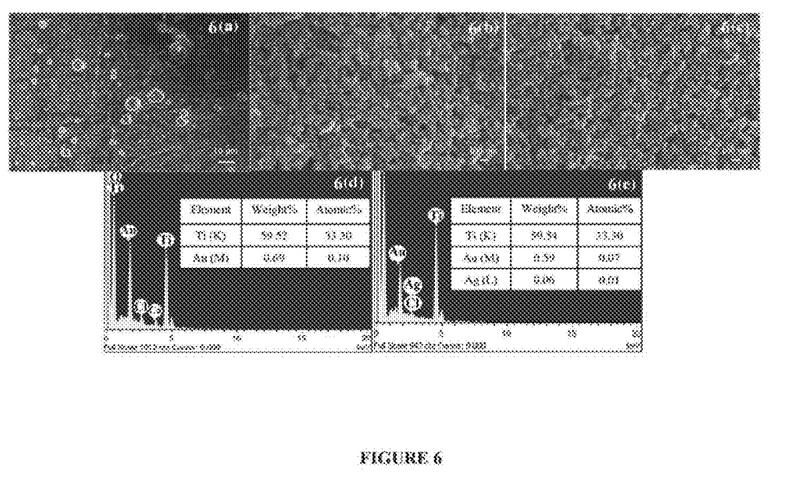
FIG. 6 shows scanning electron microscopy (SEM) images of titania, a) as-received, h) after Au doping, c) after Au/Ag co-doping and EDX results of d) Au doped titania and e) Au/Ag co-doped titania.

Scanning Electron Microscopy:

The SEM images of the samples, shown in FIGS. 6a, 6b and 6c, further confirm the results obtained from particle size distribution analysis of as-received titania, Au doped titania and Au/Ag co-doped titania, respectively. The doped particles were spherical in nature and mostly regular in shape. The as-received titania was found to be polydispersed and mostly bigger in size whereas the ball milled doped samples were having relatively uniform particle sizes (below 100 nm).

The metal deposition on the surface of titania was confirmed by EDX analysis shown in FIGS. 6d and 6e for Au doped titania and Au/Ag co-doped titania, respectively. A high yield of gold loading (0.69% and 0.59% for Au doped titania and Au/Ag co-doped titania, respectively) was confirmed for both the samples (Au loading in dopant was 1.5% and 0.6%, respectively).

Photocatalytic Activity Test

Figure 9:
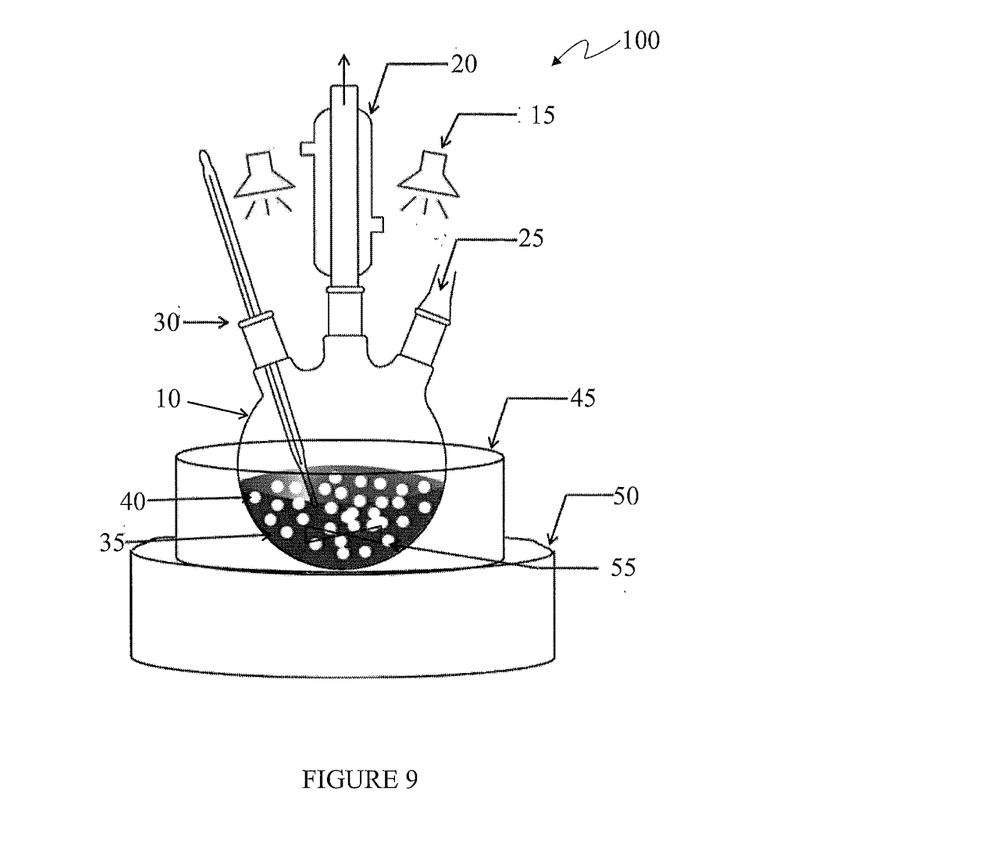
FIG. 9 shows laboratory setup for photoreactor.

The photocatalytic experiments were carried out in a photoreactor (100), shown in FIG. 9. It consists of a three-neck round-bottom flask (10), four tungsten lamps (15) (200 W, Philips) (source of visible light), a water condenser (20) (to avoid loss of water due to evaporation). The distance between the light source and surface of the reaction solution is 20 cm. One of the openings (25) in the three-neck flask is used to purge air inside the reactor and the other opening (30) is used for sampling/temperature measurement. The lower portion of the reactor, containing polluted water (35) along with the photocatalyst (40) is kept inside a water bath (45), mounted on a magnetic stirrer (50). Throughout the photocatalytic experiments, the pollutant solution is mixed thoroughly with a magnetic stir bar (55) and the temperature is maintained at 50° C.-60° C.

Photocatalytic activity of gold doped $TiO_2$ was evaluated by the degradation of 6.5 ppm methyl orange (MO) dye. In a typical experiment, 200 mg of photocatalyst was dispersed in 140 ml of MO solution. After 20 min stirring under dark environment for adsorption-desorption equilibrium, the photocatalyst solution was kept inside the photoreactor (as shown in FIG. 9) with continuous stirring for 3 hours. After every 30 minutes, around 5 ml of aliquots were sampled, centrifuged at 14,000 rpm for 10 minutes and then filtered through millipore filter to remove titania particles. The filtrate was analyzed by UV visible spectrometer and the corresponding absorbance values were used to measure concentration of MO in the solutions.

Table 3 summarizes the photocatalytic conversion of methyl orange (MO) under visible light irradiation for doped titania particles prepared in accordance with the present disclosure. For comparative analysis, similar experiments were carried out using commercial titania photocatalyst (Degussa P25) and milled titania without any dopant.

TABLE 3

| Experiment | Dopant | Photocatalytic conversion after 3 hrs under visible light irradiation |
|---|---|---|
| P25 titania | Nil | 60% |
| Titania (as-received) | Nil | 33% |
| Milled titania | Nil | 27% |
| Example 1 | Au | 70% |
| Example 11 | Au/Ag | 68% |
| Example 2 | Au | 30% |

Figure 7:
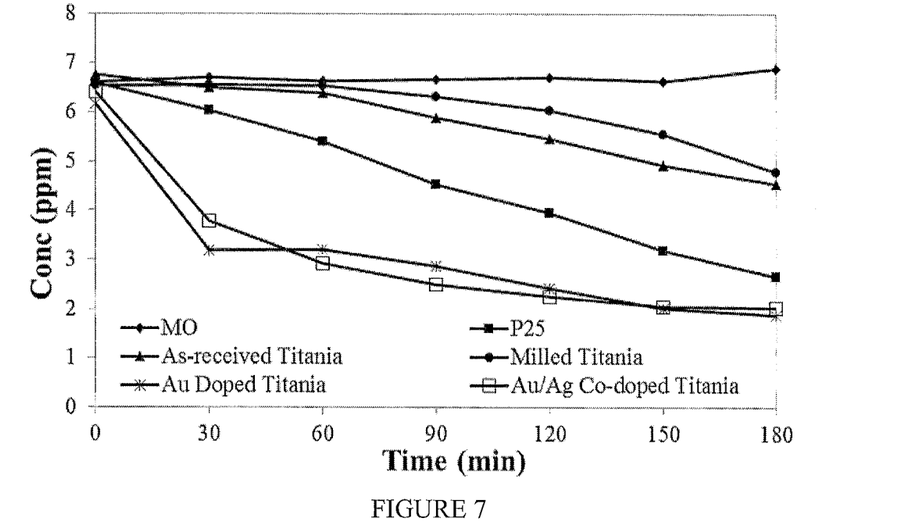
FIG. 7 shows photocatalytic degradation of methyl orange (MO) over time under visible light irradiation of a) blank MO, b) P25, c) as-received titania, d) milled titania, e) Au doped titania and f) Au/Ag co-doped titania.

As can be seen from FIG. 7, the degradation of MO in presence of Au doped and Au/Ag co-doped titania is very fast as compared to other samples under visible light irradiation. Milling of as-received titania decreases its photocatalytic activity. Commercial titania shows better activity as compared to as-received titania, but the photocatalytic activity of the prepared Au doped and Au/Ag co-doped titania exceeded beyond commercial titania.

Figure 8:
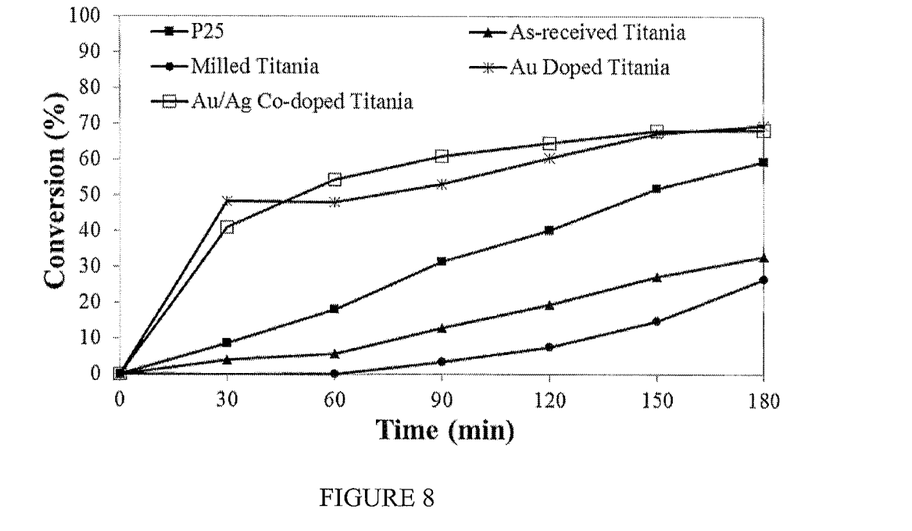
FIG. 8 shows photocatalytic conversion of methyl orange (MO) over time under visible light irradiation in presence of a) P25 and b) as-received titania c) milled titania d) Au doped titania and e) Au/Ag co-doped titania.

The photocatalytic conversion of MO can be calculated from the following expression:

$$\eta = (C_0 - C_t)/C_0 * 100$$

where,
$\eta$ = photocatalytic conversion
$C_0$ = concentration of MO before illumination
$C_t$ = concentration of MO after illumination time t FIG. 8 shows the plot of conversion of MO against irradiation time. It can be seen that within just 30 minutes, 48% and 41% of MO was degraded in presence of Au doped and Au/Ag co-doped titania, respectively whereas the conversion for P25, as-received titania and milled titania were 9%, 4% and 0% at that time. Finally, after 3 hours of irradiation, 70% and 68% of the MO was degraded in presence of Au doped and Au/Ag co-doped titania, respectively (corresponding conversion for commercial titania, as-received titania and milled titania were 60%, 33% and 27%, respectively).

Potential Applications

Potential applications of Au doped and Au/Ag co-doped titania nanoparticles may be in air/water purification, antibacterial applications, self-cleaning coatings, deodorization, photoelectrochemical cells for conversion of solar energy to electrical energy etc. In all of these applications, the photocatalytic activity of doped titania (in UV as well as in visible light) can be used. Also, co-doping of Au and Ag (where less amount of gold is used) can reduce the cost of Au doped titania without compromising with its photocatalytic activity.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the specific steps of the preferred process, it will be appreciated that many steps can be made and that many changes can be made in the preferred steps without departing from the principles of the disclosure. These and other changes in the preferred steps of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A process for the synthesis of visible light responsive doped titania photocatalytic nanoparticles, said process comprising the following steps:
   a) milling a mixture, containing:
      i) titania;
      ii) a precursor compound, wherein the precursor compound is at least one selected from the group consisting of chloroauric acid and a mixture containing chloroauric acid and silver nitrate;
      iii) water; and
      iv) oxide milling media, wherein the oxide milling media consists of zirconia balls;
      at a temperature in the range of 20 to 50° C. for a period of 30-240 minutes, to form a slurry, wherein the amount of water is in the range of 15 to 25% by weight of the total mixture; and
   b) filtering the slurry to separate the oxide milling media from the filtrate and further washing of the filtrate with water to obtain doped titania photocatalytic nanoparticles.

2. The process as claimed in claim 1, wherein the process further includes the step of drying the filtrate by any one of the methods selected from the group consisting of freeze drying, vacuum drying and air drying at low temperature.

3. The process as claimed in claim 1, wherein the ratio of precursor compound to titania particles is in the range of 1:80 to 3:80 w/w.

4. The process as claimed in claim 1, wherein the zirconia balls used is in the size range of 0.4-0.7 mm.

5. The process as claimed in claim 1, wherein the doped titania is a gold doped titania and the amount of gold atoms doped on titania surface is in the range of 0.5 to 0.7% by weight.

6. The process as claimed in claim 5, wherein the gold doped titania further comprises silver atoms on titania surface in the range of 0.02 to 0.07% by weight.

7. The process as claimed in claim 1, wherein the doped titania photocatalytic nanoparticles having particle size is in the range of 85-90 nm.

8. The process as claimed in claim 1, wherein the doped titania photocatalytic nanoparticles show no agglomeration.

9. Doped titania photocatalytic nanoparticles having particle size in the range of 85-90 nm, having photocatalytic activity under visible light irradiation, wherein the doped titania photocatalytic nanoparticles are gold doped titania and the amount of gold doped on the titania surface is in the range of 0.5-0.7% by weight.

10. The doped titania photocatalytic particles as claimed in claim 9, wherein the doped titania photocatalytic nanoparticles further comprises silver atoms on the titania surface and the amount of silver atoms on the titania surface is in the range of 0.02-0.07% by weight.

* * * * *